United States Patent [19]

Grafius

[11] Patent Number: 4,733,050
[45] Date of Patent: Mar. 22, 1988

[54] ROBOTIC WELDING HEAD CLEANING APPARATUS

[75] Inventor: Gerald R. Grafius, Erie, Pa.

[73] Assignee: American Sterilizer Company, Erie, Pa.

[21] Appl. No.: 947,657

[22] Filed: Dec. 30, 1986

[51] Int. Cl.⁴ .............................................. B23K 9/24
[52] U.S. Cl. ............................. 219/125.1; 219/136; 219/137.43; 901/42
[58] Field of Search ............... 219/125.1, 136, 137.43; 901/42

[56] References Cited

U.S. PATENT DOCUMENTS

| | | | |
|---|---|---|---|
| 4,538,047 | 8/1985 | Nakano et al. | 219/125.1 |
| 4,609,804 | 9/1986 | Kishi et al. | 219/136 |
| 4,645,901 | 2/1987 | Scholz et al. | 219/125.1 |

FOREIGN PATENT DOCUMENTS 216881  1/1985  German Democratic Rep. .............. 219/137.43

*Primary Examiner*—Clifford C. Shaw
*Attorney, Agent, or Firm*—Kirkpatrick & Lockhart

[57] ABSTRACT

An apparatus for maintaining the weld tip and gas nozzle of a robotic welding apparatus is provided. The present invention includes a plurality of functional stations at which various operations may be performed on the gas nozzle and/or welding tip. In the first station, the gas nozzle is removed from the welding arm and the interior surface of the gas nozzle is cleaned by means of a rotating brush. In the second station of the present apparatus, a cutter slide serves to pin and shear the weld wire from the weld tip. The third station of the instant apparatus includes a grinding belt which serves to grind the leading face of the weld tip. Following the grinding operations of station three, the welding arm may be returned to station one for the reapplication of the gas nozzle and then to station four for the pneumatic application of an anti-spatter compound. Thereafter, the welding arm may be moved to station five of the present invention which includes a reference block in order that the robot arm may be positioned and welding wire extended therefrom until it contacts the reference block to establish a predetermined length of weld wire extending from the weld tip. In the event it is desired to replace the weld tip after a prescribed period of operation, following the removal of the gas nozzle and the clipping of the wire from the weld tip, the welding arm is moved to a tip removal and application station.

15 Claims, 14 Drawing Figures

ROBOTIC WELDING HEAD CLEANING APPARATUS

BACKGROUND OF THE INVENTION

1. Field of the Invention

The present invention relates to automatic welding apparatuses and, in particular, to an apparatus for automatically cleaning the gas nozzle and refinishing and/or replacing the welding tip of a robotic welding apparatus.

2. Description of the Invention Background

In various environments, it has proven expedient to employ an automatic apparatus for accomplishing the welding of articles to be joined. A particular welding apparatus that has achieved considerable commercial success is known as a gas MIG automatic welder. In such an apparatus, a robotic arm is employed to move a welding head which comprises a contact or weld tip through which weld wire continuously passes to feed an arc welding process. Typically, a gas nozzle is provided on the robot arm in surrounding relation to the weld tip in order that inert gas may be applied around the weld tip and to the weld site during welding to avoid the inclusion of contaminants in the weld. As such, the robot arm moves the weld tip along the intended weld area while welding wire is being fed therethrough to the weld site and inert gas is caused to flow over the weld site.

A particularly troublesome problem which has arisen in connection with such automatic welding apparatuses is the development of weld spatter around and inside the gas nozzle and around the weld tip. The weld spatter is a hard material which is generated during the welding process and which collects on these surfaces and is known to build up to a considerable degree if not removed periodically. Spatter can restrict the gas flow between the gas nozzle and the weld tip and thereby prevent a complete shielding of the weld site by the inert gas. Spatter can also build up on the weld tip to a point at which weld wire feed is impeded and the arc welding process is damaged. If the build-up continues to excess, a complete breakdown of the welding process may be caused by the spatter. While anti-spatter compounds are available for spray application to the gas nozzle weld tip, they serve only to delay the deposition of spatter, not to prevent it.

In an initial effort to correct the problems caused by weld spatter, operators of automatic welding apparatuses were forced to halt the welding process in order that the gas nozzle and the weld tip could each be manually removed and cleaned. Obviously, this activity was time-consuming and grossly inefficient and the enhanced productivity to which the automatic apparatus was directed was lost due to the required manual cleaning of the gas nozzle and weld tip. In those environments in which several robotic welders are used simultaneously either a worker was forced to enter a most hazardous area or all such welders had to be halted in order that the gas nozzle and/or welding tip of one welding arm could be cleaned.

In one apparatus, it was attempted to automatically conduct certain cleaning operations relating to the gas nozzle and welding tip. In that apparatus, the gas nozzle was physically restrained by the cleaning apparatus and a formed milling tool was employed to mill the weld spatter from the exterior surface of the gas nozzle and from portions of the weld tip. There, a hydraulic motor was employed to grasp the gas nozzle and a vertical hydraulic cylinder was used to move a milling apparatus rotated by a rotating hydraulic motor into engagement with the weld tip and gas nozzle. Thereafter, anti-spatter compound was sprayed on the gas nozzle and welding tip.

Certain shortcomings have been encountered with the maintenance apparatus described above. First, due to the design of the clamping means which grasps the welding head, damage may occur to the welding head during clamping. Second, each configuration of gas nozzle and welding tip required its own cutter to mill the appropriate surfaces of the gas nozzle and welding tip. The maintenance of a battery of cutters to accommodate each welding tip—gas nozzle configuration proves costly. In addition, due to the limitations of milling apparatuses, milling was not possible on the entire inner surface of the gas nozzle which surface is precisely that upon which spatter normally collects and restricts gas flow. Further, again due to the limitations of the milling cutter, the entire weld tip was not able to be effectively cleaned from spatter. In addition, the previous apparatus had no means for removing the gas nozzle and replacing one weld tip with another.

Accordingly, the instant invention is directed toward an improved apparatus for cleaning the gas nozzle and weld tip of an automatic welding apparatus which overcomes, among others, the above-discussed problems and which provides a cleaning apparatus which is effective in the cleaning of gas nozzles and the cleaning and/or replacement of weld tips yet does not require a lengthy shutdown of welding apparatus operations.

SUMMARY OF THE INVENTION

In accordance with the present invention, there is provided a maintenance apparatus for removing and cleaning the gas nozzle and cleaning and/or replacing the weld tip of an automatic welding apparatus. The present apparatus includes a plurality of stations which are effective to remove and clean the gas nozzle and clean and replace the weld tips of an automatic welding apparatus. In connection with the instant apparatus, various air motors are provided which are actuated by four-way pneumatic valves which are controlled by electric solenoids which, in turn, are controlled by the central processing unit which controls the robotic welding apparatus itself.

In the first station of the instant apparatus, the robot arm is lowered into a bore in a locking slide and a horizontal reciprocating pneumatic cylinder causes the locking slide to engage and restrain the gas nozzle. The robotic arm may then be elevated so that the gas nozzle is retracted from the welding arm. A rotary pneumatic motor is then actuated to rotate a brush which is advanced into the gas nozzle by a reciprocating pneumatic motor to thereby clean the inner surface of the gas nozzle.

In the second station of the present apparatus, the welding tip is lowered to a specified point so that a reciprocating pneumatic motor may cause a cutting slide to grasp and shear the weld wire to remove the weld ball and present a square end of the wire weld.

In station three, a rotary pneumatic motor rotates a abrasive grinding belt adjacent to a stabilizing member. In this station, after the weld wire is retracted, the weld tip may be introduced into the stabilizing member and lowered to a point at which the face of the weld tip may be ground by the grinding belt.

Following the grinding operations of station three, the robot arm is caused to return to the first station and re-enter the gas nozzle which is retained by the locking slide. Shortly after the robot arm enters the gas nozzle, the locking slide is retracted and the welding arm is urged downward so that the gas nozzle is caused to further engage the welding arm to its fully applied position.

The welding arm is then retracted from the first station and traversed to the proper coordinates above station four of the maintenance apparatus. At station four, while the welding arm is maintained in a predetermined orientation, an anti-spatter compound is pneumatically applied to the gas nozzle and the welding tip. At the conclusion of this operation, the robot arm is moved to station five and fixed at a given specified set of coordinates in relation thereto. The energized welding wire is then caused to be extended from the welding tip until it contacts the grounded reference block of station five thereby causing a short which is sensed by the robot circuit to cause a predetermined length of welding wire to be exposed from the weld tip.

In the event it is desired to replace the welding tip, following the removal of the gas nozzle in station one and the clipping of the wire in station two, the robot arm is then caused to move to station six. In station six, the robot arm is brought to a position above an unload spindle which is rotated in a tip removal direction by a rotary pneumatic motor. The robot arm is then caused to be moved downward into engagement with the unload spindle such that the spindle will cause the tip to be unscrewed from the welding arm. The welding arm is then raised until it clears station six. A replacement tip shuttle pneumatic motor is then actuated to cause a replacement weld tip to be indexed from a magazine and dropped into a loading spindle which is also rotated by means of the rotary air motor in station six. At this point, the cross slide of station six is indexed so that the loading spindle occupies the location previously occupied by the unload spindle. The welding arm is then lowered into the loading spindle so that the new tip may be applied to the welding arm. Following this action, a pneumatic burst is applied beneath the unload spindle to cause the used tip to be ejected therefrom. The cross slide is then retracted so that the loading spindle is in its position ready to receive a new weld tip.

After the new tip is applied, the welding arm is returned to station one in order that the gas nozzle may be reapplied and then to station four for an application of the anti-spatter compound and to station five in order that the welding wire may be extended to the proper length.

Accordingly, the present invention provides solutions to the aforementioned problems present with automatic welding apparatuses. As this invention provides an effective means of removing the gas nozzle and cleaning it, clipping the wire, grinding the weld tip, reapplying the gas nozzle, applying anti-spatter compound and setting the weld wire length as well as replacing used weld tips, the problems caused by spattering during welding operations are alleviated. In addition, as the present invention provides the automatic cleaning and/or replacement of welding tips, the welding operations need not be interrupted for lengthy periods which provides increased welding apparatus efficiency. Further, a plurality of robotic welding arms may be maintained by the instant apparatus and no personnel are required to enter the hazardous operation area of multiple welding arms.

These and other details, objects and advantages of the invention will become apparent as the following description of the present preferred embodiment thereof proceeds.

BRIEF DESCRIPTION OF THE DRAWINGS

In the accompanying drawings, I have shown a present preferred embodiment of the invention wherein.

DETAILED DESCRIPTION OF THE PREFERRED EMBODIMENT

Figure 1:
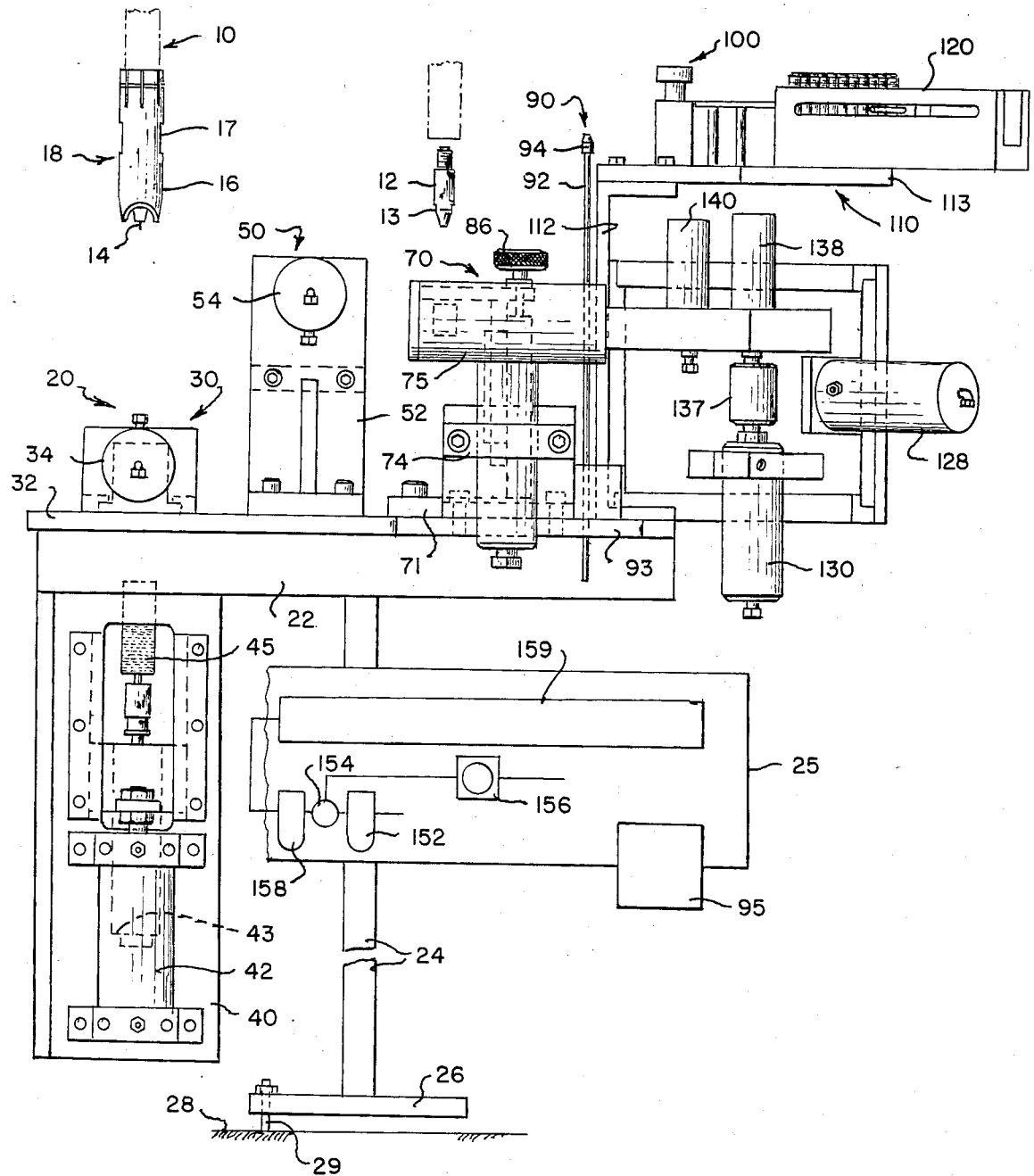
FIG. 1 is a rear elevation view of the welding tip maintenance apparatus provided herein.

Referring now to the drawings where the showings are for purposes of illustrating the present preferred embodiment of the invention and not for purposes of limiting same, the Figures show a robotic welding arm 10 having a weld tip 12 screwedly applied thereto which is formed of a material such as copper and from which extends a weld wire 14. A gas nozzle 16 is coaxially pressed onto the end of welding arm 10 to surround weld tip 12. Weld tip 12 is formed with recessed flattened areas 13 on the sides thereof and gas nozzle 16 is formed with recessed flattened areas 17 formed on its sides. Weld tip 12 and gas nozzle 16 comprise a welding head 18 of welding arm 10. In the operation of welding arm 10, the welding head 18 is moved to predetermined XYZ coordinates at which a welding operation is to occur. Inert gas is caused to flow through gas nozzle 16 around weld tip 12 to the weld site. Weld tip 12 is then moved to a position at which weld wire 14 is caused to contact the welding site thereby initiating arc welding operations. Welding arm 10 is then moved in a programmed pattern about the surfaces to be welded while weld wire 14 is continuously fed from weld tip 12. Robotic welding arm 10 is controlled by a central processing unit which is capable of ascertaining the position of welding arm 10 by reference to a reference location, moving welding arm 10 in response to programmed movement instructions and controlling the feed and retraction of weld wire 14 from weld tip 10.

It has been discovered that during welding operations of a robotic arc welder, a phenomenon known as spattering occurs. During spattering, a hard refuse material is produced by the welding operation which becomes adhered to the gas nozzle 16 inner surface as well as to the weld tip 12. Such spatter can cause a limited flow of the inert gas, such as argon or helium, which is employed to protect the weld site from contaminants. It is to the removal of spatter from the gas nozzle 16 and the weld tip 12 that the present invention is directed.

Figure 2:
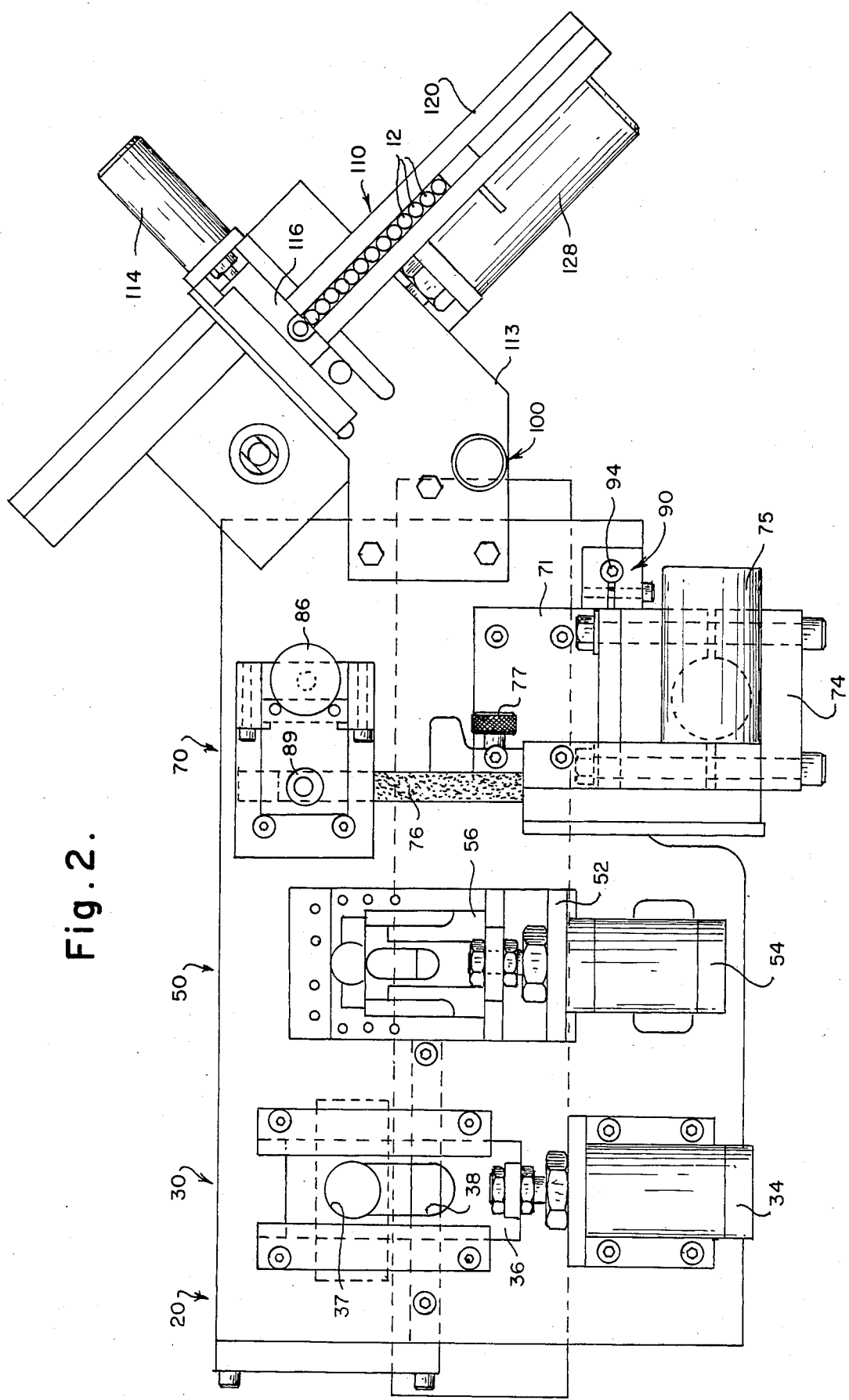
FIG. 2 is a plan view of the present invention.
Figure 3:
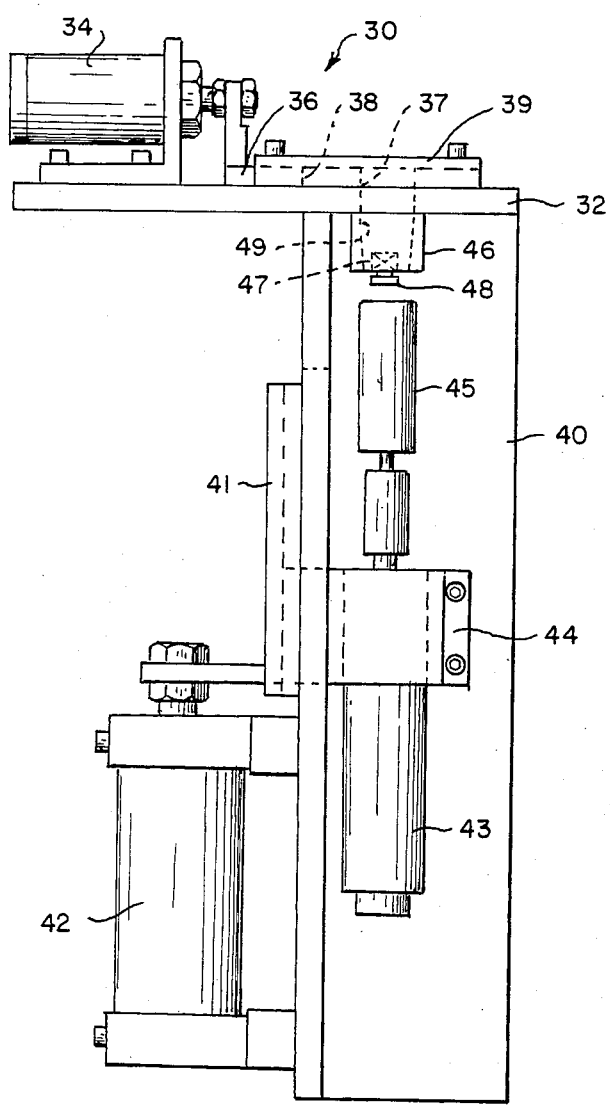
FIG. 3 is a side elevation view of station one of the instant apparatus.
Figure 4:
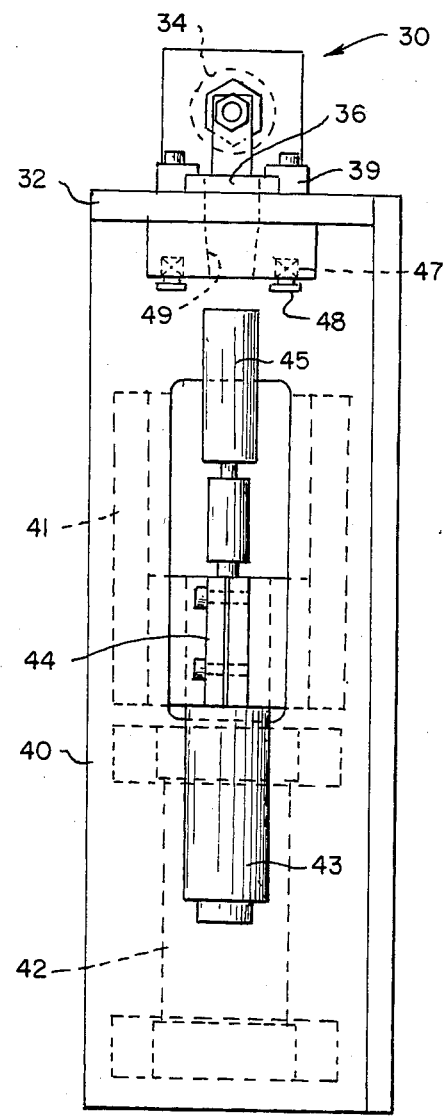
FIG. 4 is a front elevation view of station one.
Figure 6:
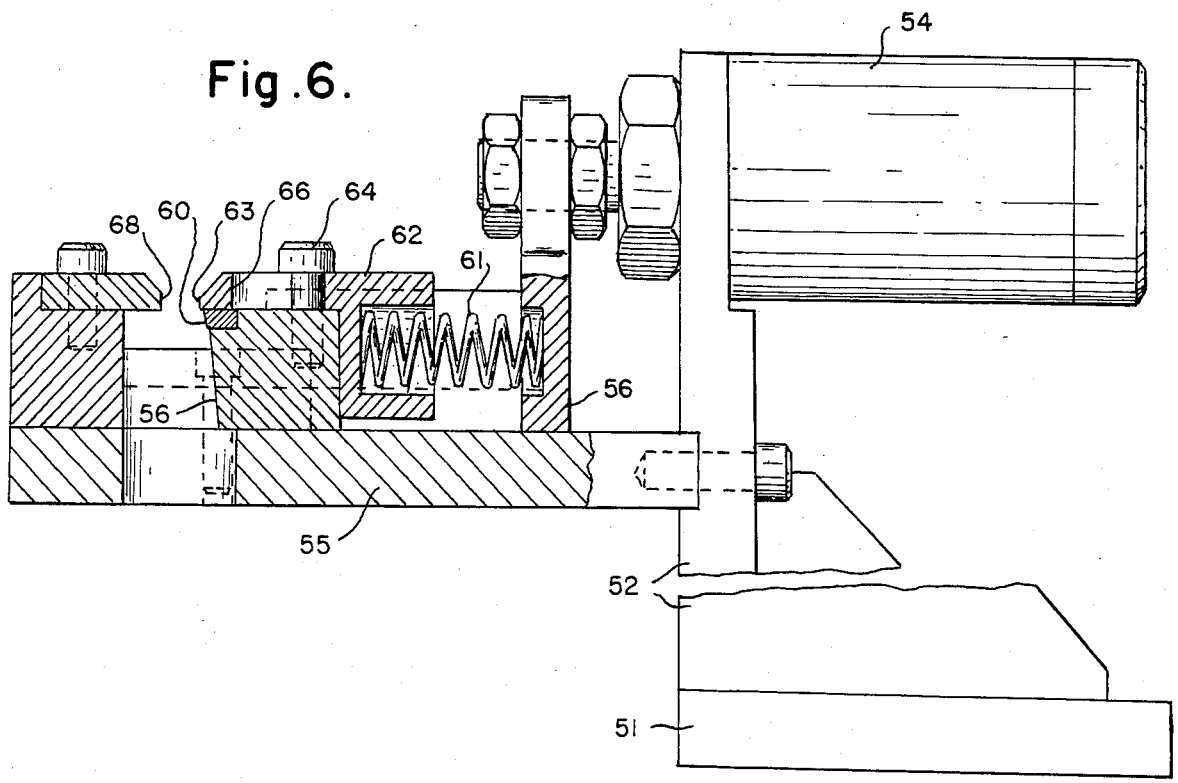
FIG. 6 is a side elevation sectional view of station two.
Figure 5:
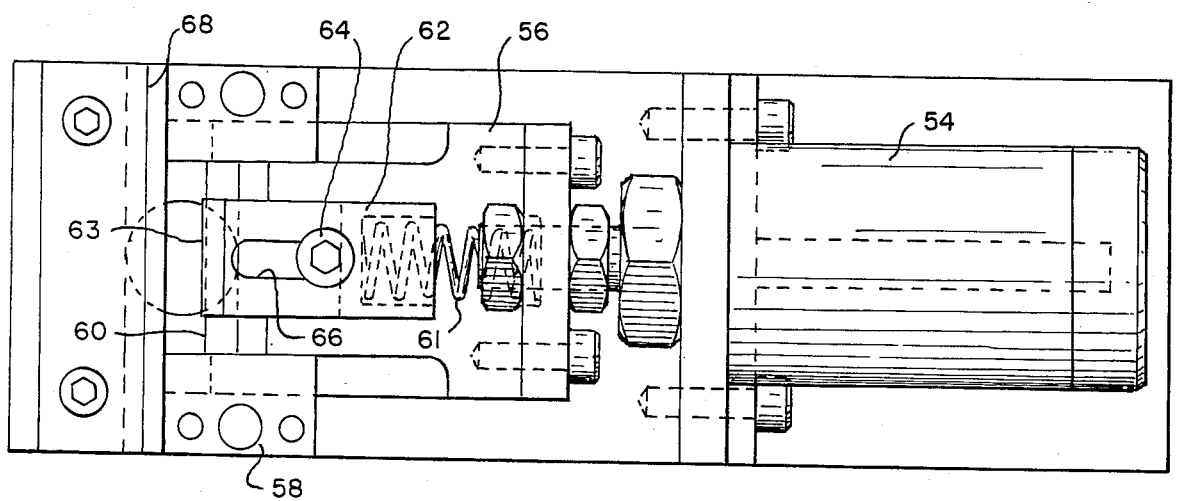
FIG. 5 is a plan view of station two of the instant apparatus.
Figure 7:
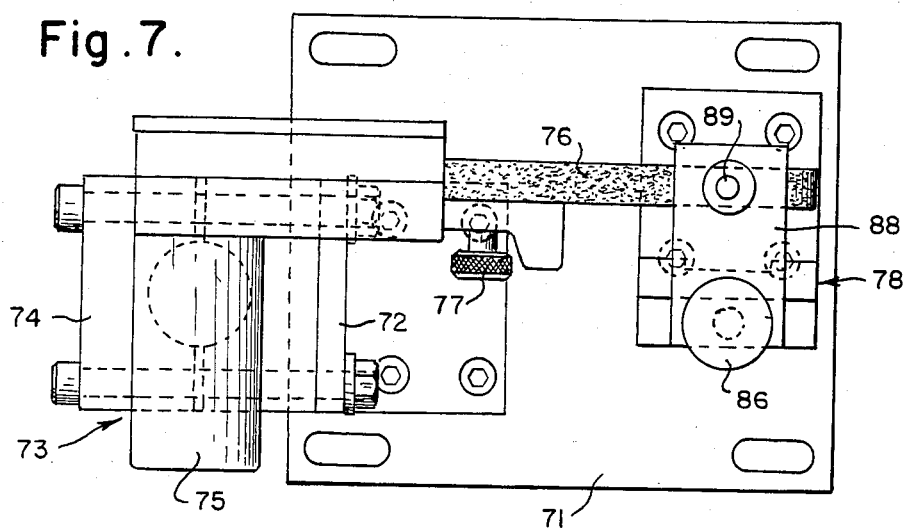
FIG. 7 is a plan view of station three of the invention.
Figure 8:
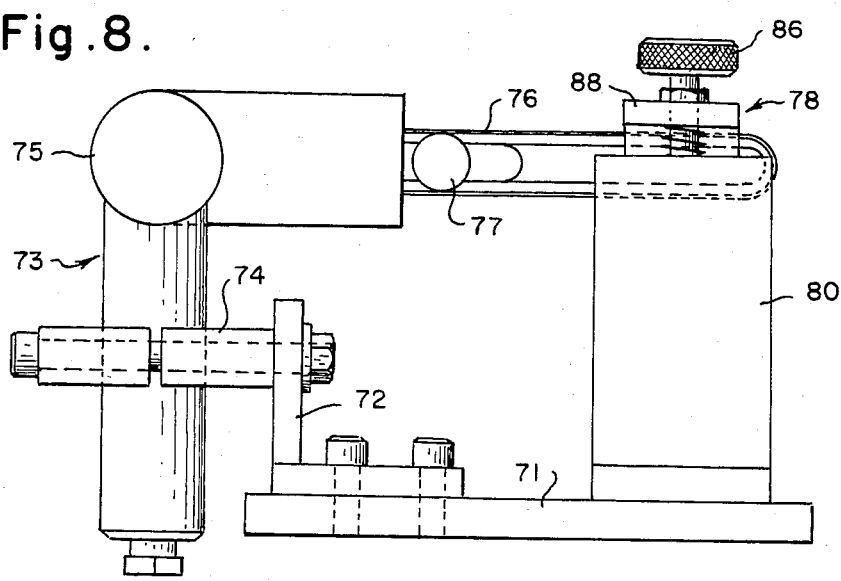
FIG. 8 is a side elevation view of station three.
Figure 9:
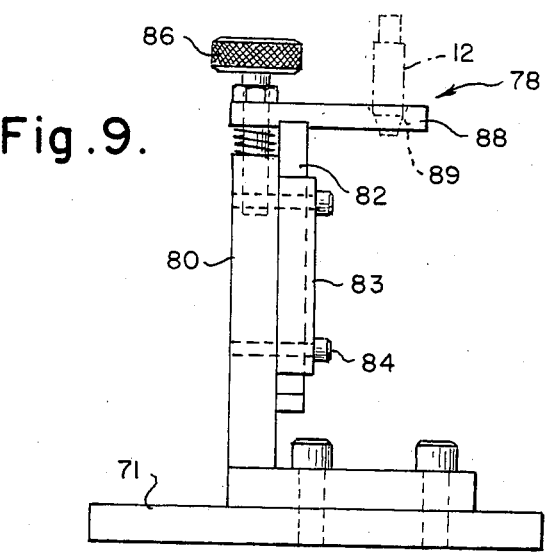
FIG. 9 is an end elevation view of a portion of station three.
Figure 10:
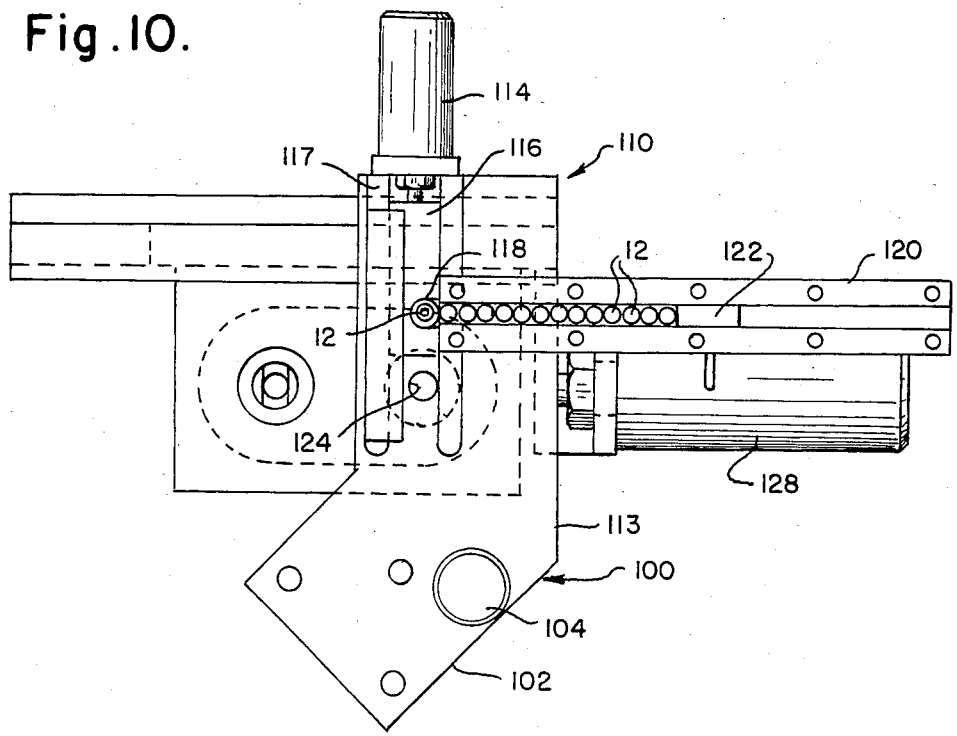
FIG. 10 is a plan view of station six of the present apparatus in one position.
Figure 11:
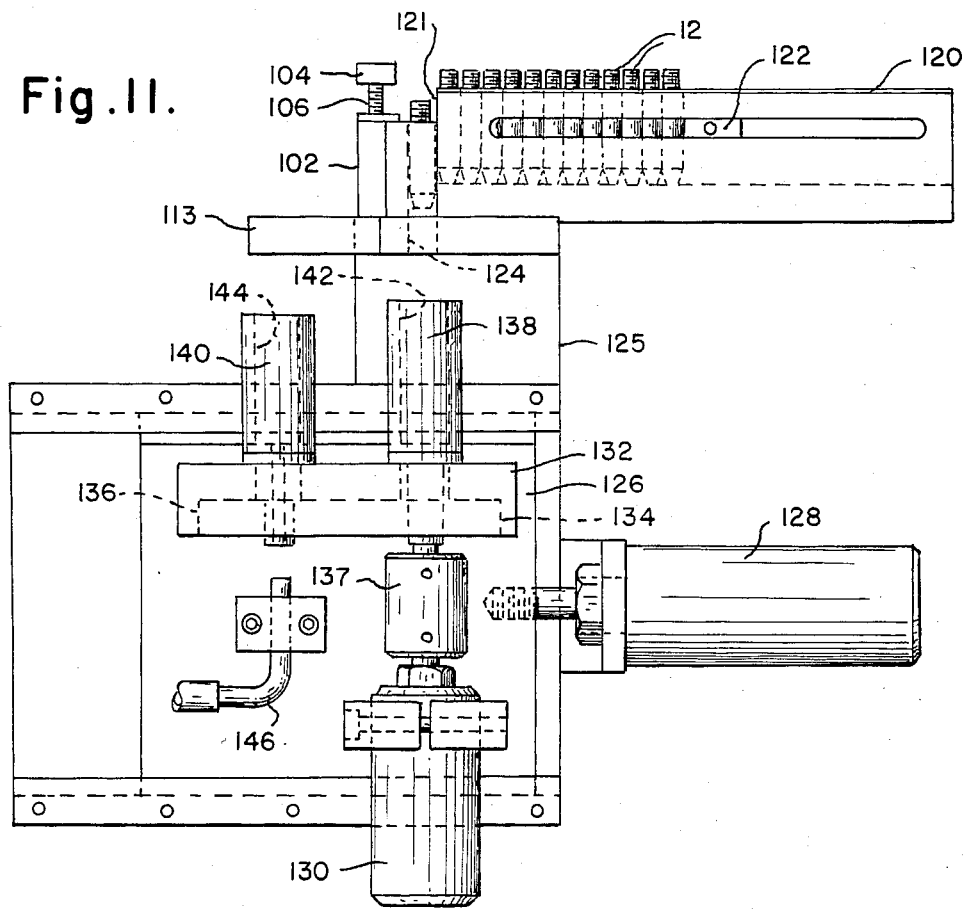
FIG. 11 is a side elevation view of station six in one position.
Figure 12:
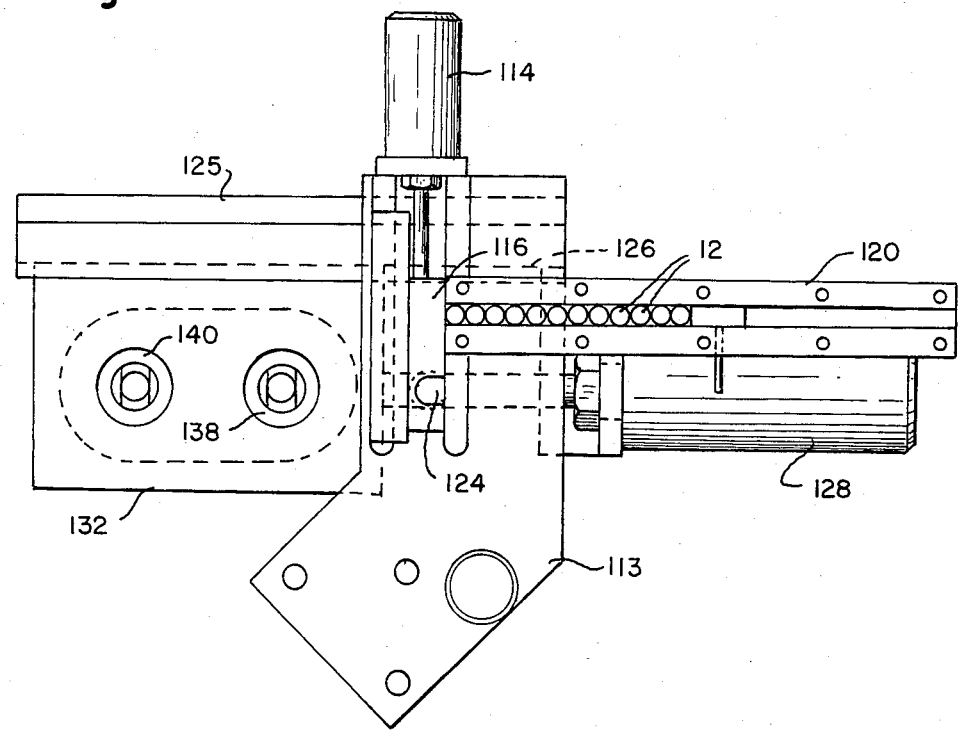
FIG. 12 is a plan view of station six of this invention in its indexed position.
Figure 13:
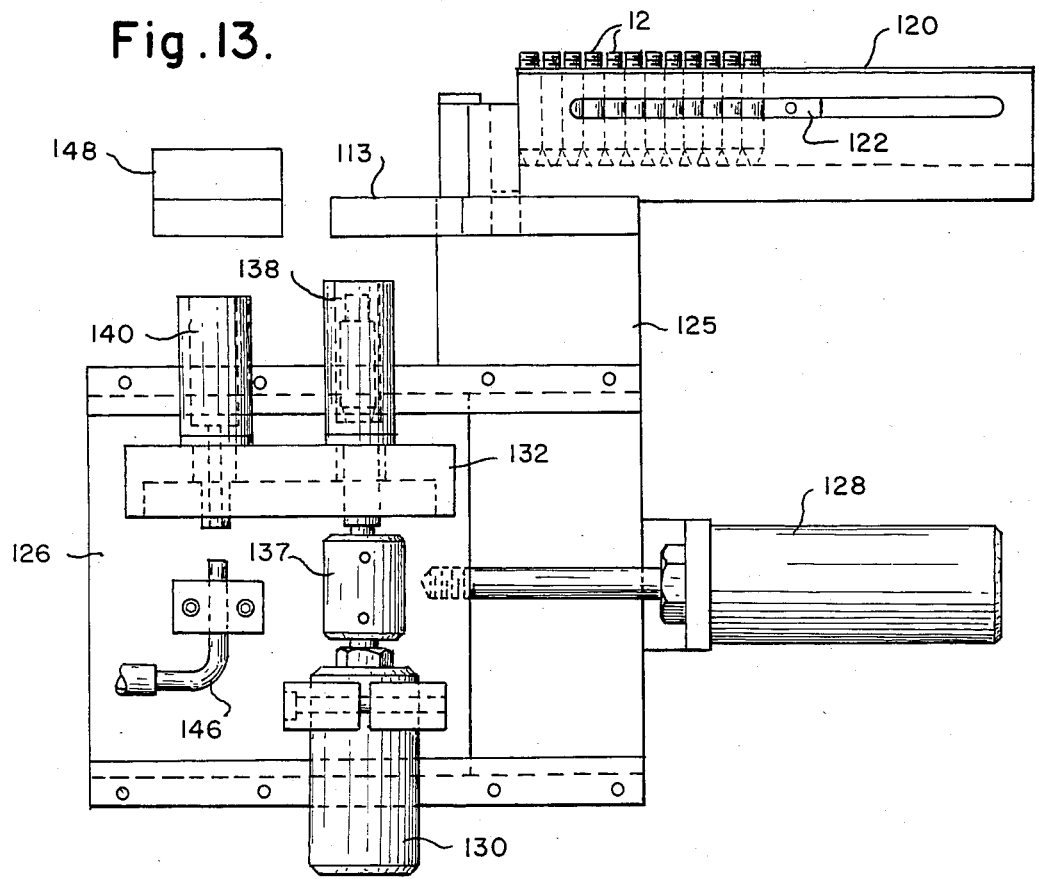
FIG. 13 is a side elevation view of station six in its indexed position.
Figure 14:
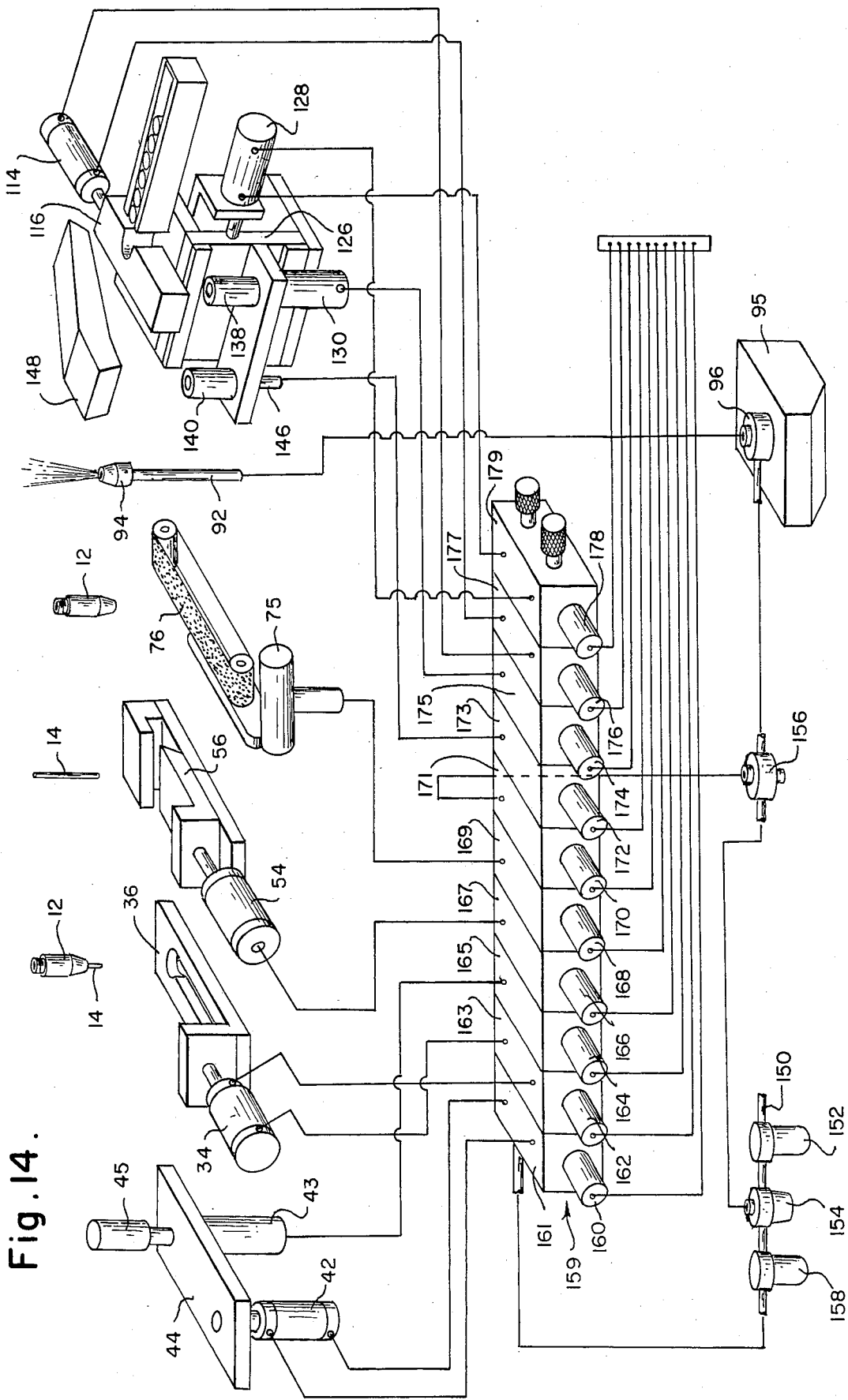
FIG. 14 is a schematic representation of the electrical and pneumatic components of the instant invention.

More particularly, and with reference to FIGS. 1 and 2, there is shown an apparatus for removing and cleaning the gas nozzle 16 and cleaning and/or removing the weld tip 12 of robot arm 10. The present invention comprises a series of stations at which operations are performed on the gas nozzle 16 and/or the weld tip 12. The maintenance apparatus 20 provided by the instant invention includes a series of work stations which are supported on a frame member 22 which, in turn, is supported on a pedestal 24 that is attached to a base 26. The base 26 may be adjustably attached to the ground 28 by means of height adjustable attachment means 29.

In order to accomplish the various functions performed by maintenance apparatus 20, a plurality of discrete stations are provided which are capable of performing the requisite operations on gas nozzle 16 and/or weld tip 12. As such, maintenance apparatus 20 includes a first station 30 wherein the removal and cleaning of gas nozzle 16 occurs, a second station 50 for accomplishing the clipping of the end of the weld wire 14 from the weld tip 12, a third station 70 for grinding the face of weld tip 12, a fourth station 90 for applying an anti-spatter compound to gas nozzle 16 and weld tip 12, a fifth station 100 at which a predetermined length of weld wire 14 may be extended from weld tip 12 and a sixth station 110 at which a used weld tip 12 may be removed from welding arm 10 and a replacement weld tip 12 applied thereto. Robot arm 10 is moved between the various stations of the instant apparatus under the control of its programmable controller which also controls the operation of the various pneumatic devices described hereinbelow. The maintenance operations performed by maintenance apparatus 20 are triggered by the return of the welding arm 10 to its home position following a welding operation.

First station 30 includes a base plate 32 which is secured to frame member 22 and which supports a horizontally reciprocating pneumatic motor 34. The end of the piston rod of pneumatic motor 34 is connected to the upstanding portion of a horizontally displaceable locking slide 36. Locking slide 36 includes an aperture 37 therethrough which is open to a slot portion 38. The diameter of aperture 37 is greater than that of the diameter of gas nozzle 16, while the width of slot 38 is less than the diameter of gas nozzle 16 but greater than the diameter of gas nozzle 16 across the recessed portions 17 thereof. The movement of locking slide 36 is constrained on base plate 32 by means of gibs 39.

First station 30 also includes a downwardly depending center plate 40 to which there is attached a pair of vertical gibs 41. A lifting pneumatic cylinder 42 is also attached to center plate 40. A rotary pneumatic motor 43 is attached to lifting pneumatic motor 42 by means of a bracket 44. The rotary output of rotary motor 43 is connected to an abrasive treated nylon brush 45. The nylon based brush 45 is employed to avoid contamination of gas nozzle 16. As such, when the piston rod of lifting pneumatic cylinder 42 is extended, rotary motor 43 is caused to move vertically. Extending downwardly from base plate 32 is a take-up block 46 which is supported by base plate 32 by means of springs 47 which are attached to bolts 48. Take-up block 46 is provided with an aperture 49 therethrough which corresponds to the outer shape of gas nozzle 16.

In the operation of first station 30, the robot arm 10 is caused to be positioned over aperture 37 in locking slide 36. Robot arm 10 is then lowered by its programmable controller until the recessed areas 17 on gas nozzle 16 are at the elevation of slot 38 on locking slide 36. Linear pneumatic motor is then actuated by the application of pneumatic pressure to move the locking slide 36 so that slot 38 engages the recesses 17 of gas nozzle 16. In this position, the gas nozzle 16 may not be vertically displaced. The robot arm 10 is then vertically withdrawn from gas nozzle 16 and moved to second station 50. Simultaneously, pneumatic pressure is applied to rotary pneumatic motor 43 thereby causing the rotation of brush 45. The piston of lifting pneumatic motor 42 is then extended by the application of pneumatic pressure thereby lifting rotary motor 43 and rotating brush 45 into contact with gas nozzle 16 to effectuate the cleaning of weld spatter from the inner surface thereof. Following the complete insertion of brush 45 into gas nozzle 16, the lifting pneumatic cylinder 42 is pneumatically retracted thereby causing brush 45 to be removed from gas nozzle 16. Following the return of lifting pneumatic cylinder 42 to its retracted position, the rotation of rotary pneumatic motor 43 may be halted.

Second station 50, as indicated above, is that station which is employed to cut the weld wire 14 which is extended from weld tip 12. It is necessary to remove the end of weld wire 14 from the supply as a ball of weld wire 14 frequently forms on the tip thereof. Accordingly, following the removal of gas nozzle 16 from robot arm 10 in first station 30, the robot arm 10 is moved by its control means to a position above second station 50. During such movement of robot arm 10, an additional length of weld wire 14 is extended from weld tip 10 to allow the tip of weld wire 14 to be sufficiently remote from weld tip 12 to allow its clipping. Second station 50 includes a base plate 51 which is attached to frame member 22. A vertical support 52 supports a linearly acting pneumatic motor 54. Vertical support 52 also supports a horizohtally extended support member 55. Mounted for horizontally sliding movement on horizontal support 55 is a shear plate 56. The horizontal movement of shear plate 56 is guided by gibs 58 and is motivated by means of the attachment of shear plate 56 to the extendible piston rod of linear pneumatic motor 54. As such, when the piston rod of linear pneumatic motor 54 is extended and retracted, shear plate 56 is moved correspondingly. Shear plate 56 supports a cutting insert blade 60. Additionally, a clamping block 62 is provided to slide on shear plate 56 and is biased away from linear pneumatic motor 54 by means of springs 61. Clamping block 62 is provided with a clamping surface 63 on its leading edge. A screw 64 attached to shear plate 56 acts in a slot 66 on clamping block 62 to assure its attachment to shear plate 56. A backing surface 68 is provided in facing relation to clamping surface 63 and cutting blade 62 in order to cooperate with those members to allow the clamping and cutting, respectively, of weld wire 14.

In the operation of second station 50, the robot arm 10 is lowered so that the weld tip 12 is in proximity to second station 50. Linear pneumatic motor 54 is then pneumatically actuated to cause shear plate 56 to be horizontally advanced. As shear plate 56 is extended, clamp surface 63 of clamping block 62 first contacts the weld wire 14 thereby pinning it between clamping surface 63 and backing surface 68. Following the clamping of weld wire 14 by means of the cooperation of clamping surface 63 and backing surface 68, the extension of the piston of pneumatic motor 54 is continued thereby further extending shear plate 56 and, hence, cutting blade 60, in order that wire 14 may be clipped by means of the cooperation of cutting blade 60 and backing surface 68. During this step of the operation of second station 50, the shear plate 56 continues to move relative to clamping means 62 and slot 66 rides along screw 64, against the bias of spring 61. The clipped portion of weld wire 68 may then be captured by a suitable receptacle (not shown) which is preferably susceptible of visual inspection.

Third station 70 of maintenance apparatus 20 includes a base plate 71 which is attached to frame member 22 and which supports a bracket 72 which is effective to support a grinder 73. Grinder 73 includes an adjustable support member 74 to which there is attached a rotary pneumatic motor 75. Rotary pneumatic motor 75 serves to rotate a grinding belt 76 which is coated with an abrasive substance effective to remove weld spatter from weld tip 12. The lateral orientation of grinding belt 76 may be adjusted by means of an adjustment screw 77 mounted adjacent to rotary motor 75. Third station 70 also includes a weld tip 12 stabilization area generally indicated as 78. Stabilization area 78 includes a bracket 80 which extends vertically upward from base plate 71. Bracket 80 supports a slide plate 82 which is mounted on bracket 80 by means of gibs 83 attached thereto by means of screws 84 mounted on bracket 80. An adjustment screw 86 serves to adjustably position a stabilization plate 88 which includes an aperture 89 corresponding to the outer shape of weld tip 12 to protect weld tip 12 from excessive lateral force during grinding.

As such, in the operation of third station 70, the robot arm 10 is moved into a position above aperture 89 of positioning plate 88 while the weld wire 14 is retracted into weld tip 12 away from the end thereof. When robot arm 10 reaches the position above aperture 89, the rotary pneumatic motor 75 is caused to initiate the rotation of grinding belt 76. Robot arm 10 is then lowered so that weld tip 12 enters aperture 89 in stabilization plate 88. With proper positioning of the weld tip 12 by its programmable controller, it will be in proper position relative to grinding belt 76 when it is in aperture 89 so that an appropriate amount of grinding of the face of weld tip 12 may be accomplished to remove any weld spatter therefrom and yet avoid undue lateral stresses on welding arm 10. A preferred amount of weld tip 12 to be removed by grinding may be 0.005 inch.

Following the grinding of the face of weld tip 12 by means of grinder 73 in third station 70, the robotic arm 10 is returned to the coordinates vertically positioned above gas nozzle 16 which has been retained by slot 38 of locking slide slot 36 in first station 30 in order that gas nozzle 16 may be reapplied to robotic welding arm 10. When the welding arm 10 has reached such coordinates, it is vertically lowered until welding arm 10 begins to engage gas nozzle 16. At this point, the pneumatic motor 34 is retracted so that locking slide 36 is moved in order that slot 38 no longer engages gas nozzle 16 and gas nozzle 16 is surrounded by aperture 37 in locking slide 36. In order to more fully apply gas nozzle 16 to welding arm 10, robot arm 10 is continued in its downward movement into take-up block 46 against the bias of springs 47. Such downward motion is continued until gas nozzle 16 is fully applied to welding arm 10 while robot arm 10 is protected by the action of springs 47 against take-up block 46.

Following the reapplication of gas nozzle 16 to robot welding arm 10, welding arm 10 is moved into position adjacent fourth station 90 of maintenance apparatus 20. In fourth station 90, an anti-spatter compound is applied to weld tip 12 and gas nozzle 16. Fourth station 90 includes a vertically extended tube 92 which is secured to a base member 93 which, in turn, is attached to frame member 22. Provided on the end of tube 92 is an application nozzle 94. A reservoir 95 contains a supply of anti-spatter compound known to those skilled in the art. Antispatter compound is removed from reservoir 95 by means of a pneumatic venturi means 96 which is powered by means of pneumatic pressure from a supply as described below. As such, in the operation of fourth station 90, when robot arm 10 is positioned thereabove, pneumatic pressure is caused to enter venturi 96 thereby creating a low pressure region therein which causes anti-spatter compound to be drawn from reservoir 95 and ejected by nozzle 94 onto weld tip 12 and gas nozzle 16.

Following the application of anti-spatter compound to weld tip 12 and gas nozzle 16, the appropriate length of weld wire to reinitiate the welding process must be extended from weld tip 12. Accordingly, robot arm 10 is repositioned to a position above station five 100, the weld wire 14 adjustment station. Station five 100 includes a vertically extended member 102 mounted on a horizontal plate 113 (described below) and by means of a threaded member 106 screwedly adjustably supports an electrically grounded reference block 104. As such, the height of reference block 104 relative to base plate 21 may be adjusted by the adjustment of the position of reference block 104 relative to vertical member 102. Accordingly, robot arm 10 is moved to a predetermined position above station five and the weld wire 14, which is connected to a source of electrical power, is caused to be extended from weld tip 12 until the weld wire 14 contacts the grounded reference block 104. Such contacting of weld wire 14 with reference block 104 will produce an electrical short due to the grounding of reference block 104. The short will provide information relative to the increased current flow between weld wire 14 and reference block 104 to the computer control of the robot arm 10 to instruct it to halt the feed of the weld wire 14 thereby establishing a predetermined length of weld wire 14 relative to weld tip 12 based on the known values of the coordinates of reference block 104 and of weld tip 12.

In accordance with the present invention, there is also provided a means for removing weld tips 12 from robot arm 10 and providing a new or refinished weld tip 12 on robot arm 10. Such functions of the present invention are provided at sixth station 110. It has been discovered that weld tips 12, due to their copper construction, wear to an unacceptable degree after a specified length of weld wire 14 has passed therethrough. The controller for welding arm 10 typically includes a mechanism for ascertaining the amount of welding wire 14 which is fed per unit of welding time. As such, the present invention preferably includes a clock device for measuring a period of time corresponding to that length of weld wire 14 which has passed through weld tip 12 to cause damage thereto. Following the passage of such time period, the controller for welding arm 10 may be caused to automatically initiate weld tip replacement as herein described.

Sixth station 110 includes a vertically extending support bracket 112 which supports an angled horizontal plate 113. In the preferred embodiment of the present invention, horizontal plate 113 may also serve as the support for fifth station 100 of maintenance apparatus 20. Horizontal plate 113 supports a linear pneumatic motor 114. The piston rod of linear pneumatic motor 114 is connected to a transfer slide 116 which is provided to slide horizontally on horizontal plate 113 while guided by gibs 117. Transfer slide 116 is provided with as recessed area 118 which conforms to the shape of the weld tip 12. Also attached to horizontal plate 113 is a magazine 120 which contains a supply of weld tips 12. Weld tips 12 are biased toward the exit point 121 of magazine 120 by means of a backing member 122 which is biased by a spring means (not shown) toward exit point 121. The operation of linear motor 114 serves to move transfer slide 116 from a first position in which a weld tip 12 may be inserted into recessed area 118 to a second position at which the weld tip may be dropped through an aperture 124 for purposes to be described hereinbelow.

Sixth station 110 also includes a downwardly extending bracket 125 which supports a vertical plate 126 for horizontal sliding movement. Such movement is motivated by means of a linear pneumatic cylinder 128 which is attached to vertical bracket 125 and which has the piston rod thereof connected to vertical plate 126. As such, the linear movement of the piston of linear cylinder 128 causes vertical plate 126 to be reciprocated. Vertical plate 126 also supports a rotary pneumatic motor 130. A bracket 132 is provided above rotary motor 130 and supports a first gear 134 and a second gear 136 which are in meshing relation. First gear 134 is driven by rotary motor 130 through a torque coupling 137 in a first direction which causes second gear 136 to be rotated in the opposite direction. A loading spindle 138 is attached to first gear 134 and an unloading spindle 140 is attached to second gear 136 by means of torque coupling 141 so that it rotates in correspondence thereto. Loading and unloading spindles 138 and 140, respectively, include chambers 142 and 144, respectively which are adapted to the shape of the weld tip 12. That is, chambers 142 and 144 each include a bore having a flattened region to engage the flat recesses 13 on weld tip 12. In addition, chambers 142 and 144 are each provided with spring means (not shown) at the bottom of such chambers to alleviate an excess of downward force on welding arm 10 when welding arm 10 is lowered thereto as described hereinbelow. Sixth station 110 also includes a pneumatic tube 146 which is provided beneath unload spindle 140 so that pneumatic pressure may be provided beneath unload spindle 140 to eject a weld tip 12 therefrom. A chute 148 is provided adjacent sixth station 110 to catch any weld tips ejected therefrom.

In the operation of sixth station 110, following the removal of gas nozzle 16 by first station 30 and the clipping of weld wire 14 by second station 50, the robot arm 10 is caused to achieve coordinates immediately above unload spindle 140 when linear pneumatic cylinder 128 is its retracted state. Rotary pneumatic motor 130 is then activated so as to cause the rotation of first gear 134 and second gear 136 thereby rotating load spindle 138 and unload spindle 140, respectively. Welding arm 10 is then lowered so that weld tip 12 is caused to enter chamber 144 of unload spindle 140. This action causes chamber 144 to engage weld tip 12 and the rotation of unload spindle 140 causes weld tip 12 to be unscrewed from welding robot arm 10. The welding arm 10 is protected from undue longitudinal stresses due to the action of the spring in unload spindle 140 and the operation of torque coupling 137. Welding arm 10 is then raised above unload spindle 140 and maintained in that position. Simultaneously, transfer slide 116 is retracted by linear motor 114 so that a replacement weld tip 12 is entrained in recessed area 118 of transfer slide 116. The piston of horizontal linear pneumatic motor 114 is then extended thereby moving transfer slide 116 to a position at which replacement weld tip 12 is caused to pass through aperture 124 which is directly above load spindle 138. By this action, the replacement weld tip 12 is caused to enter load spindle 138 and become engaged in chamber 142 thereof such that the recessed areas 13 of replacement weld tip 12 are engaged by chamber 142. The linear cylinder 128 is then extended thereby moving vertical plate 126 horizontally on vertical bracket 125 to a position in which load spindle 138 occupies the position originally occupied by unload spindle 140 beneath welding arm 10. Welding arm 10 is then lowered above load spindle 138 which is continuously rotating with replacement weld tip 12 therein so that replacement weld tip 12 is screwed onto robot arm 10. Welding arm 10 is protected in this position by the action of the spring in load spindle 138 and torque coupling 137. Welding arm 12 is then retracted and a burst of pneumatic pressure is caused to pass through pneumatic tube 146 into unload spindle 140 thereby causing the ejection of used weld tip 12 from unload spindle 140. The linear cylinder 128 is then retracted thereby moving vertical plate 126 to a position in which load spindle 138 is beneath aperture 124.

Following the application of replacement weld tip 12 to welding arm 10, welding arm 10 is preferably returned to first station 30 in order that the gas nozzle 16 may be reapplied thereto as discussed above. Following the reapplication of gas nozzle 16, robot arm 10 is then preferably moved to fourth station 90 for the application of the anti-spatter compound and then to fifth station 100 for the extension of the weld wire 14 to a predetermined length.

The welding arm 10 is moved between the stations of maintenance apparatus 20 described herein by the programmable controller thereof. That controller also serves to control the operation of the various pneumatic devices of the respective stations of the present invention. In particular, the operation of the various pneumatic devices described hereinabove are controlled by means of electric solenoids which control four-way pneumatic valves. All pneumatic supply pressure is input to the maintenance apparatus 20 by means of input port 150. Such pneumatic input preferably comes from a pneumatic supply source, in proximity to welding arm 10. The pneumatic input passes through a filter 152 to a regulator 154. A pneumatic take-off from pneumatic regulator 154 is provided to a pilot-operated air valve 156 for purposes described below. The bulk of the pneumatic pressure is provided through a pneumatic lubrication device 158 and input to a bank 159 of ten four-way pneumatic valves which are respectively controlled by electric solenoids. It will be appreciated by those skilled in the art that the electric solenoids themselves are controlled by the central processing unit which controls the welding arm 10. The bank of pneumatic valves 159, the electric solenoids (described below), the filter 152, regulator 154, lubrication device 158, pilot air valve 156, and anti-spatter compound reservoir 95 are mounted on a mounting plate 25 supported on pedestal 24.

First electric solenoid 160 controls the pneumatic valve 161 which controls the pneumatic input to both sides of linear pneumatic motor 42 to provide the raising and lowering of bracket 44. Second solenoid 162 controls the pneumatic valve 163 which controls the pneumatic input to both sides of linear pneumatic motor 34 which is employed to move locking slide 36 relative to gas nozzle 16. Third electric solenoid 164 controls a pneumatic valve 165 which, in turn, controls the application of pneumatic fluid to rotary pneumatic motor 43 which drives brush 45. Fourth electric solenoid 166 controls a pneumatic valve 167 which controls the application of pneumatic fluid to linear pneumatic motor 54 and, hence, shear plate 56, of second station 50. Fifth electric solenoid 168 controls a pneumatic valve 169 which controls the application of pneumatic fluid to rotary pneumatic motor 75 of grinder 73 to turn grinding belt 76. Sixth electric solenoid 170 controls a pneumatic valve 171 which controls the application of pneumatic fluid to pilot-operated air valve 156. As such, the pneumatic activation of pilot-operated air valve 156 serves to allow pneumatic pressure to directly pass from regulator 154 to the venturi 96 attached to reservoir 95 of anti-spatter compound and thereby cause anti-spatter compound to be applied to weld tip 12 and gas nozzle 16 by means of nozzle 94. Seventh electric solenoid 172 controls a pneumatic valve 173 which controls the application of pneumatic fluid to pneumatic tube 146 beneath unload spindle 140 of sixth station 110. Eighth electric solenoid 174 controls a pneumatic valve 175 which controls the application of pneumatic fluid to rotary pneumatic motor 130 of sixth station 110. Ninth electric solenoid 176 controls a pneumatic valve 177 which supplies pneumatic fluid to both sides of linear pneumatic motor 114 which operates transfer slide 116. Finally, tenth electric solenoid 178 controls a pneumatic valve 179 which controls the application of pneumatic fluid to both sides of linear pneumatic cylinder 128 which serves to move vertical plate 126.

It will be understood that various changes in the details, materials and arrangements of parts which have been herein described and illustrated in order to explain the nature of the invention may be made by those skilled in the art within the principal and scope of the invention as expressed in the appended claims.

What is claimed is:

1. Apparatus for maintaining a welding arm having a weld tip attached thereto such that weld wire extends normally from a face of said weld tip, said welding arm having a cylindrical gas nozzle releasable attached thereto which coaxially surrounds said weld tip, comprising:
   a. means for removing said gas nozzle from and for reapplying said gas nozzle to said welding arm;
   b. means for cutting said welding wire which extends from said weld tip to facilitate retraction of said welding wire; and
   c. means for cleaning said face of said weld tip when said gas nozzle is removed from said welding arm.

2. Apparatus of claim 1 further comprising means for cleaning the inner surface of said gas nozzle, including:
   a. a first rotary motor having a rotating brush means position coaxially adjacent to said gas nozzle when gas nozzle has been removed from said welding arm; and
   b. means for axially advancing said brush means into and out of said gas nozzle.

3. Appratus of claim 1 further comprising means for applying an anti-spatter compound to said weld tip, weld tip face, and said gas nozzle after said face of said weld tip has been cleaned and said gas nozzle has been cleaned and reapplied to said welding arm.

4. Apparatus of claim 3 in which said means for applying an anti-spatter compound comprises a pneumatic venturi nozzle connected to a source of pneumatic pressure and effective to draw said anti-spatter compound from a reservoir thereof and deliver said anti-spatter compound to a nozzle for application to said weld tip and said gas nozzle.

5. Apparatus of claim 1 wherein said gas nozzle includes flattened recessed areas formed on the opposing sides thereof, and in which said means for removing and reapplying said gas nozzle comprises:
   a. a locking slide having a first area having an aperture of greater diameter than said gas nozzle and a slot open to said first area, said slot being of a width which is greater than the diameter of said gas nozzle across said recessed areas but less than the diameter of said gas nozzle; and
   b. means for reversably moving said locking slide from an unlocked position in which said aperture surrounds said gas nozzle to a locked position in which said slot engages said flattened areas of said gas nozzle.

6. Apparatus of claim 1 in which said means for cutting comprises:
   a. a reciprocatable slide means having a cutting member attached thereto;
   b. a backing surface in facing relation to said cutting member;
   c. a spring-biased gripping means movably supported on said slide means; and
   d. a linear motor effective to move said slide means from a retracted position remote from said backing surface to a gripping position in which said gripping means grips said weld wire against said backing surface and a cutting position in which said cutting member cuts said wire against said backing member.

7. Apparatus of claim 1 in which said means for cleaning said face of said weld tip comprises:
   a. a continuous grinding belt; and
   b. a rotary motor for continuously advancing said grinding belt.

8. Apparatus of claim 1 in which said means for removing and replacing said weld tip comprises:
   a. a rotary motor mounted on a slide bracket and effective to produce a rotary output in one direction;
   b. a first rotating spindle driven by said rotary motor and mounted on said slide bracket and which rotates in a direction effective to apply said welding tip to said welding arm;
   c. a second rotating spindle which is mounted on said slide bracket and driven by said first spindle and rotates in a direction effective to remove said weld tip from said welding arm;
   d. a magazine containing weld tips;

e. a reciprocating carriage capable of removing a weld tip from said magazine and delivering it to said first spindle;

f. linear motor means for reciprocating said carriage;

g. means for horizontally reciprocating said slide bracket betwen a first position in which said second spindle is vertically adjacent to said welding arm and a second position in which said first spindle is vertically adjacent to said welding arm; and h. means for ejecting said weld tip from said second spindle when said slide bracket is in said second position.

9. A method of maintaining a robotic welding arm having a weld tip attached thereto such that weld wire extends normally from a face of said weld tip, said welding arm having a cylindrical gas nozzle attached thereto and which coaxially surrounds said weld tip, comprising;

a. removing sid gas nozzle from said welding arm;

b. cutting said welding wire which extends from said weld tip;

c. retracting said welding wire;

d. cleaning said face of said weld tip when said gas nozzle is removed from said welding arm; and e. reapplying said gas nozzle to said welding arm.

10. Method of claim 9 further comprising the step of cleaning said inner surface fo said gas nozzle by rotary brushing.

11. Method of claim 9 further comprising the step of applying an anti-spatter compound to said weld tip, weld tip face, and said gas nozzle after said face of said weld tip has been cleaned and said gas nozzle has been cleaned and reapplied to said welding arm.

12. Method of claim 9 further comprising the step of causing a predetermined length of weld wire to be extended from said weld tip.

13. Method of claim 12 in which said step of causing a predetermined length of said weld wire to be extended comprises:

a. providing an electrically grounded metallic surface at a fixed location;

b. connecting a source of electrical power to said weld wire;

c. moving said weld tip to a location a distance from said fixed location equal to said predetermined length;

d. extending said weld wire from said weld tip;

e. sensing the electrical power present on said weld wire; and f. halting the advancement of said weld wire when the electrical power on said weld wire is sensed to be flowing to ground.

14. Method of claim 9 in which the step of removing said gas nozzle having flattened areas on the diametrical sides thereof from said weld tip comprises:

a. inserting said gas nozzle through an aperture of greater diameter that said gas nozzle whoch is provided in a locking slide;

b. indexing said locking slide such that a slotted area thereof of a diameter greater than that of said gas nozzle across said flattened areas but less than that of said gas nozzle engages said flattened areas; and c. retracting said welding arm from said gas nozzle.

15. Method of claim 14 in which said step of reapplying said gas nozzle to said welding arm comprises:

a. inserting said welding arm into said gas nozzle while said gas nozzle is restrained by said locking slide;

b. moving said locking slide such that said aperture surrounds said gas nozzle; and c. removing said welding arm to a location remote from said locking slide.

* * * * *

UNITED STATES PATENT AND TRADEMARK OFFICE
CERTIFICATE OF CORRECTION

PATENT NO. : 4,733,050

DATED : March 22, 1988

INVENTOR(S) : Gerald R. Grafius

It is certified that error appears in the above-identified patent and that said Letters Patent is hereby corrected as shown below:

Col. 11, line 57, delete "releasable" and substitute therefor --releasably--.

Col. 13, line 19, delete "sid" and substitute therefor --said--.

Col. 13, line 28, delete "fo" and substitute therefor --of--.

Col. 14, line 21, delete "whoch" and substitute therefor --which--.

Signed and Sealed this

Fifteenth Day of November, 1988

Attest:

DONALD J. QUIGG

*Attesting Officer*

*Commissioner of Patents and Trademarks*